United States Patent [19]

Bartman

[11] 4,423,182
[45] * Dec. 27, 1983

[54] PRESSURE SENSITIVE HOT MELT ADHESIVES

[75] Inventor: Benjamin Bartman, Maple Glen, Pa.

[73] Assignee: Rohm and Haas Company, Philadelphia, Pa.

[*] Notice: The portion of the term of this patent subsequent to Nov. 23, 1999, has been disclaimed.

[21] Appl. No.: 349,725

[22] Filed: Feb. 18, 1982

Related U.S. Application Data

[63] Continuation-in-part of Ser. No. 339,202, Jan. 13, 1982, Pat. No. 4,360,638.

[51] Int. Cl.³ .................................................. C08K 5/09
[52] U.S. Cl. .................................. 524/367; 524/290; 524/398; 524/399; 524/368; 524/285
[58] Field of Search ............... 524/292, 290, 285, 286, 524/288, 398, 399, 367, 368

[56] References Cited

U.S. PATENT DOCUMENTS

| | | | |
|---|---|---|---|
| 3,925,282 | 12/1975 | Davis et al. | 524/399 |
| 4,014,831 | 3/1977 | Bock et al. | 524/399 |
| 4,052,527 | 10/1977 | Pastor et al. | 526/320 |
| 4,079,033 | 3/1978 | Oswitch et al. | 524/399 |
| 4,354,008 | 8/1982 | Skoultchi | 525/370 |
| 4,360,638 | 11/1982 | Bartman | 525/286 |

*Primary Examiner*—Joseph L. Schofer
*Assistant Examiner*—N. Sarofim
*Attorney, Agent, or Firm*—Alex R. Sluzas

[57] ABSTRACT

This invention is directed to compositions useful as ionomeric hot melt pressure sensitive adhesive compositions. These compositions comprise a polymer containing carboxylic acid, a miscible metal salt, and an o-methoxy-substituted aryl acid. These compositions display low melt viscosity, simplifying application, as well as improved adhesive properties, especially shear resistance.

12 Claims, 1 Drawing Figure

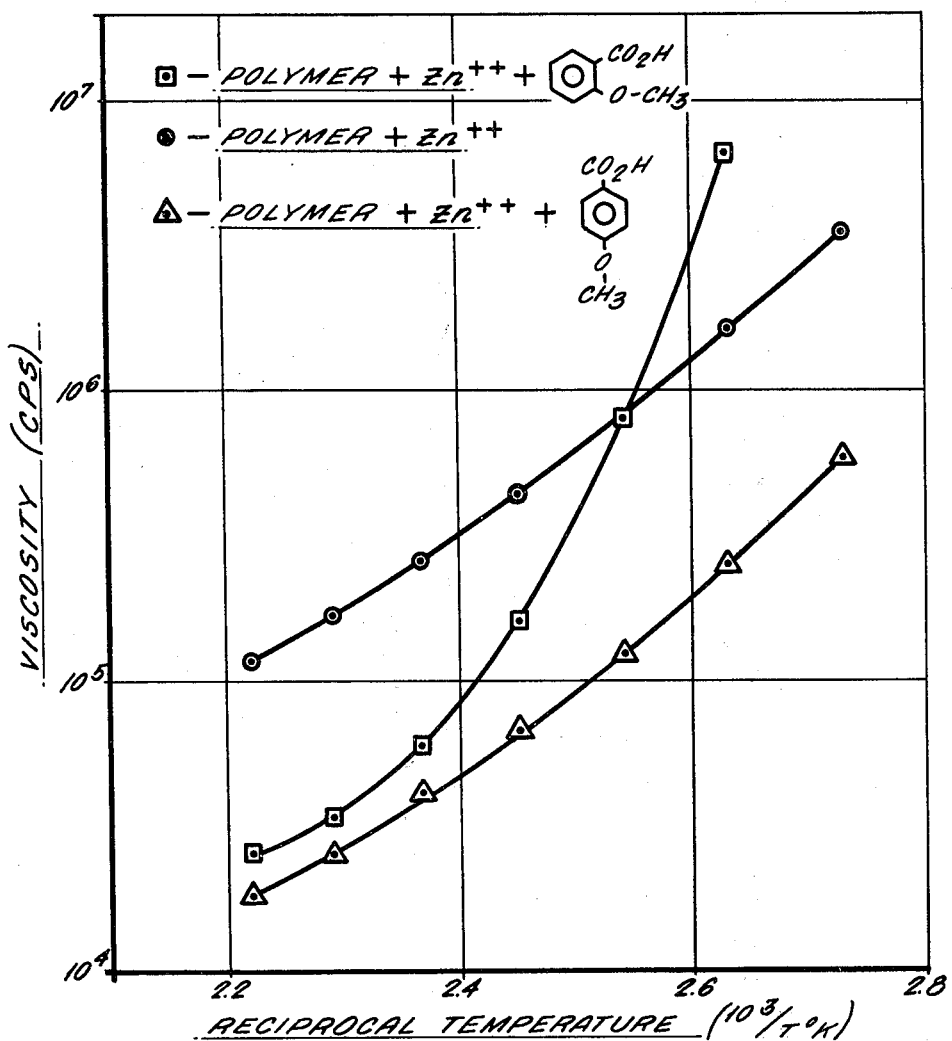

PRESSURE SENSITIVE HOT MELT ADHESIVES

BACKGROUND OF THE INVENTION

1. Field of the Invention

This application is a continuation-in-part of the inventor's copending application Ser. No. 339,202 filed Jan. 13, 1982 now U.S. Pat. No. 4,360,638, Nov. 23, 1982.

This invention relates to compositions useful as improved pressure sensitive hot melt adhesives and for other applications. As novel hot melt adhesives these compositions display low melt viscosity, simplifying application, as well as improved adhesive properties, especially shear resistance. These compositions are comprised of a polymer containing copolymerized organic acid, a miscible metal salt, and an o-methoxy-aryl acid.

2. Brief Description of the Prior Art

Hot melt pressure sensitive adhesives are tacky, soft materials at room temperature. In order to apply these materials to substrates such as paper, plastic, or cloth, these adhesives are heated to about 250°–350° F. in order to lower their viscosity so that the substrate may be easily coated. The adhesive coated substrates may then be used as, or used in the manufacture of, a variety of useful articles such as tapes, labels, decals, et al. A significant limitation on uses for which hot melt pressure sensitive adhesives may be employed is the relatively low shear resistance of these materials. Although these materials have been traditionally described as solids at room temperature, this description is in a sense erroneous. These adhesives are based on primarily thermoplastic polymers. Thus, although they can exhibit very high viscosity at room temperature, giving the appearance of soft solids, they will flow under an applied stress. Thus they are more accurately described as high viscosity polymeric liquids at room temperature. This nature is reflected in the effect of changing temperature on the viscosity of these materials. As temperature increases there is a gradual reduction of viscosity and the materials ultimately attain a viscosity low enough to make coating operations practical. After application, a temperature decline is reflected in the corresponding increase in the viscosity of the material. An ideal hot melt pressure sensitive adhesive would exhibit the mechanical properties of a true solid at room temperature while simultaneously retaining the ability to flow easily at the elevated application temperature. Although thermosetting materials as a class have proven impractical for this application, ideally, the pressure sensitive hot melt adhesive would behave as a crosslinked thermoset resin at room temperature: the application of shear stress would result merely in deformation and not in flow of the adhesive. Thus the viscosity of the ideal material would change from essentially infinite at room temperature to very low at the application temperature. Thus, in a certain sense the magnitude of this viscosity difference is a measure of quality of the hot melt adhesive.

One approach that has been used in the past to maximize this viscosity difference has been the incorporation of small amounts of functional monomers in the adhesive polymer coupled with the use of additional components to help form thermally reversible crosslinks between the polymer chains. For example, U.S. Pat. No. 3,925,282, granted Dec. 9, 1975, to Davis et al., discloses acrylic pressure sensitive hot melt adhesive compositions which contain a tertiary amine-containing monomer in the acrylic copolymer. In addition to the copolymer, these compositions contain an organo metallic salt which is capable of forming reversible coordinate crosslinks. At room temperature the presence of these crosslinks causes the hot melt adhesives to exhibit improved cohesive strength properties and increased shear resistance corresponding to higher viscosity relative to the uncrosslinked material. However, at high temperature the crosslinks are broken and the material flows easily. Another type of reversible crosslinking known to the art of pressure sensitive adhesives is effected when these compositions include a divalent metal ion such as zinc or zirconium and carboxylic acid residues attached to the polymer chain, as disclosed, for example, in U.S. Pat. No 4,145,467, granted Mar. 20, 1979, to F. T. Sanderson et al.

Another approach has been to include photo initiators in the hot melt composition which can be photopolymerized in situ after application of the adhesive to the substrate. This approach is exemplified by U.S. Pat. No. 4,052,527, granted Oct. 4, 1977, to S. D. Pastor et al., in which photoinitiators are interpolymerized with acrylic copolymers to produce ethylenically unsaturated prepolymers. These are applied in hot melt form to the substrate and are subsequently cured by exposure to ultraviolet radiation. This approach suffers from the drawbacks of requiring: (1) expensive photoinitiators, (2) ultraviolet sensitivity prior to cure, and (3) an additional cure step requiring additional process equipment.

A review of the state of the hot melt adhesive art is presented by the materials collected by D. L. Bateman in *Hot Melt Adhesives* (Noyes Data Corp., Third Edition, 1978).

SUMMARY OF THE INVENTION

One of the objects of this invention is a hot melt pressure sensitive adhesive composition displaying an improved viscosity-temperature profile in comparison with the prior art. Another object of the invention is an ionomer composition exhibiting greater viscosity sensitivity to temperature change useful as a coating or sealant. Yet another object of this invention is an acrylic hot melt pressure sensitive ionomeric adhesive exhibiting improved room temperature shear resistance. Another object of this invention is an acrylic hot melt pressure sensitive ionomeric adhesive composition exhibiting high room temperature shear resistance yet also exhibiting low viscosity at elevated application temperatures. Still another object of this invention is a hot melt pressure sensitive ionomeric adhesive composition exhibiting superior viscosity-temperature behavior in comparison with prior art compounds, while simultaneously exhibiting superior shear resistance as well as a good balance and other important adhesive properties. Another object of this invention is to provide an improved tackifying resin composition for styrene-butadiene and styrene-isoprene block copolymer adhesive compositions. These objects and other objects which will become apparent below are met by this invention which comprises a polymer containing a monomer or monomers containing carboxylic acid residues, a metal salt capable of increasing polymer viscosity through the carboxylic acid residues located on the polymer chains and an o-methoxy aryl acid, or a metal salt of an o-methoxy aryl acid. In addition to use as pressure sensitive adhesives these compositions may be employed in many applications where it is desirable that the viscosity depends strongly on temperature. For example, these compositions can be used as temperature dependent transmission fluids, encapsulating and potting compositions for electrical and electronic components and devices, caulking and sealant compositions, laminating adhesives, and coatings for wood, paper, metal, plastics, glass and other materials. The low-high temperature viscosity of the invention facilitates coating, application or fabrication at elevated temperatures, while the elevated viscosity at low temperature is reflected in other improved physical properties.

DESCRIPTION OF THE FIGURE

The FIGURE illustrates the reciprocal temperature dependence of the viscosity of ionomeric adhesive compositions described in Examples 2, 4, and 5 below. These describe a zinc ionomer adhesive composition control, a zinc ionomer containing p-methoxybenzoic acid and a zinc ionomer adhesive composition containing o-methoxybenzoic acid respectively.

DESCRIPTION OF THE INVENTION

The compositions of this invention are comprised of at least 50% by total weight of the composition of a copolymer containing residues with pendant carboxylic acid functionality, a metal salt capable of increasing polymer viscosity through the carboxylic acid residues of the polymer and an o-methoxy-aryl acid, or a metal salt of an o-methoxy aryl acid. Many different organic polymers may be used in preparing the compositions of this invention: acrylic, styrene-butadiene, butylene, ethylene-acrylic, ethylene-vinyl acetate and propylene-higher olefin polymers may be used, as well as polyester, butene, isobutylene, isoprene and propylene polymers. Random copolymers, block copolymers, graft copolymers, interpentrating polymer networks, polymer solutions and physical polymer mixtures may be used. These may be prepared from ethylenically unsaturated monomers such as ethylene, propylene, vinyl chloride, vinyl fluoride, vinylidene chloride, 1,4-hexadiene, isobutylene, isoprene, chloroprene, styrene, vinyl acetate, acrylonitrile, vinyl alcohol, butyl acrylate, butyl methacrylate, butadiene, and 2-ethylhexyl acrylate by free-radical polymerization. It is well known in the art that polyolefin components of hot melt adhesive compositions may be partially grafted with acid monomers such as acrylic acids to increase the adhesive bonding of the hot melt compositions to nonporous metallic surfaces. See, e.g., U.S. Pat. Nos. 3,987,122, granted Oct. 19, 1976 and 3,868,433 granted Feb. 25, 1975 to Bartz et al. Acid-grafted polyolefins may also be employed in the compositions of this invention. Condensation polymers such as polyesters may also be used.

The copolymers of the instant invention are preferably prepared by the bulk or solution polymerization of acrylic or methacrylic acid esters having up to 18 carbon atoms although minor amounts of other ethylenically unsaturated monomers may also be included. The preferred alkyl methacrylates and acrylates have an average of from one to about 18 carbon atoms in the alkyl groups, and include methyl methacrylate, ethyl acrylate, butyl acrylate, butyl methacrylate, n-hexyl acrylate, heptyl acrylate, octyl methacrylate, nonyl acrylate, decyl acrylate, and the various isomers of these acrylates and methacrylates such as iso-octylacrylate. One specific preferred alkyl acrylate for use in this invention is 2-ethylhexyl acrylate. Higher alkyl acrylates and methacrylates, such as dicyclopentyloxvalkyl acrylates and methacrylates, can in be used, particularly in combination with lower acrylates and methacrylates. Each of the polymer molecules of the invention, whatever the exact nature of its ionomeric composition, must contain on the average at least one carboxylic acid bearing residue. However, 0.5-4% by weight of acidic residue is preferred. For example, at least one residue of acrylic, methacrylic, acryloxypropionic, itaconic, maleic, fumaric, or citraconic acid may be included. Non-acid bearing polymers may, however, also be included in the composition, as, for example, tackifying agents. If tackifying polymers are not used, the monomer composition must be selected so that the polymer is tacky at the temperature at which the composition is to be used.

As is known in the art, the glass transition temperature ($T_g$) of the polymer used to prepare a pressure sensitive hot melt adhesive must be below 0° C. in order for the composition to exhibit tack at room temperature. The glass transition temperature is a conventional criterion of polymer hardness and is described by Flory, *Principles of Polymer Chemistry*, (Cornell University Press, 1953) at 56–57. The $T_g$ of a copolymer of any specific composition can be approximately calculated from the $T_g$'s of the corresponding homopolymer. Fox, *Bull. Am. Physics Soc.*, 1,3, at 123 (1956). Consequently, the composition of the copolymer must be selected to give a $T_g$ below 0° C. in order for the composition to be useful as a pressure sensitive adhesive if no tackifying polymer is included in the composition. The preferred monomers can be blended to give the desired $T_g$ of the copolymer. For example, a larger proportion (e.g., 58% by weight) of methyl methacrylate ($T_g = 105°$ C.) with a smaller proportion (e.g., 42%) of n-octyl acrylate ($T_g = -80°$ C.) provides a copolymer having the desired $T_g$. Most of the esters of acrylic acid and methacrylic acid having a low $T_g$ are well known in the pressure sensitive adhesive art as monomers which confer tack on the corresponding polymer.

Other ethylenically unsaturated copolymerizable monomers having $T_g$ of above 0° C. are a useful combination with the abovementioned tackifying monomers, provided they do not adversely affect the desired properties of the adhesive (e.g., unduly raise the overall $T_g$) and do not seriously interfere with the viscosity change effected by the metal salt. These include vinyl acetate, styrene, vinyl toluene, methacrylamide, and N-methylolacrylamide. The proportions of the monomers fall within the following ranges:

| Monomer | Approximate Parts by Weight | | |
|---|---|---|---|
| | Useful Range | Preferred Range | Most Preferred Range |
| Tackifying monomer | 10–99.95 | 50–997 | 70–99.5 |
| Unsaturated carboxylic acid monomer | 0.05–20 | 0.3–10 | 0.5–6.0 |
| Other monomers | 0–89.95 | 0–49.7 | 0–29.5 |

Total of the monomers is 100 parts. These ranges, however, should not be construed as the only useful specification because the most important criteria are the glass transition temperature of the polymer and the proportion of carboxylic acid containing residues in the polymer.

If the composition is to be used for a laminating adhesive, composition need not exhibit tack at room temperature and the $T_g$ of the polymer may be accordingly adjusted upward by an appropriate choice of the monomer composition. For example, a polymer having approximately the same $T_g$ as a homopolymer of butyl methacrylate (+50° C.) is useful in a laminating adhesive composition. Similarly, in other applications, such as electronic materials encapsulation and potting media, the polymer must have a relatively high $T_g$ (e.g., ~100°-200° C.) and the monomer composition must be adjusted accordingly.

As is well known in the art, the preparation of the above-described polymers can be carried out using free radical-initiated polymerization procedures. These random polymers may be produced by solution, bulk or emulsion polymerization procedures. If the polymerization is carried out in the presence of the solvent or water, the solvent or water can be stripped from the polymer before using it as an adhesive. These polymers are preferably prepared by solution polymerization. Before the solvent is stripped however, the relatively low viscosity of the solution is taken advantage of to add the metal salt and o-methoxy aryl acid or metal salt of o-methoxy aryl acid component of the adhesive composition to the copolymer in order to effect a rapid and facile solution of these materials in the polymer solution. Although no additives are generally required, the following may be employed in the composition of this invention: Organic solvents such as toluene, xylene, acetone, methylethyl ketone, methylisobutyl ketone, halogenated hydrocarbons such as chloroform, dichloroethane and the like; tackifying agents, such as phenol resins, natural resins, coumarone-indene resins, rosin ester and hydrogenated rosin derivatives may be incorporated; fillers and pigments may be added to obtain needed properties. Typical fillers include: powdered quartz, barium sulfate, gypsum, calcium carbonate, and the like. Antioxidants, ultraviolet inhibitors, platicizers and pigments may also be employed.

A metal salt, as used throughout the specification and claims, is defined to be a metal compound miscible with the polymer, irrespective of the extent of ionic character of the bonding between the metal atom and the remainder of the compound, and may be either a simple ionic compound or a metal complex of a metal chelate, which is at least partially ionizable or soluble in the system. The metal salt can also be a salt of an o-methoxy aryl acid, e.g. zinc o-methoxybenzoate. A miscible component of the composition is defined to be one which may be added to the composition without causing an otherwise transparent thin film (~1 mil) of the composition to appear translucent. The metals are selected from groups: I A, I B, II A, II B, III B, IV B, V B, VI B, VII B, VIII, III A, IV A, V A, and VI A of the periodic table. Preferably, the metals include: sodium, potassium, lithium, copper, gallium, tin, cerium, titanium, vanadium, chromium, molybdenum, manganese, iron, cobalt, nickel, berillium, cadmium, calcium, magnesium, zinc, zircronium, barium, strontium, aluminum, bismuth, antimony, lead, cobalt or any other such metal which can be added to the composition by means of an oxide, hydroxide, or basic, acidic, or neutral salt or other compound or complex which is miscible with the polymer. Zinc and zirconium compounds are preferred. The selection of metal and the anion are governed by the miscibility of the resultant metal complex or compound with the polymer medium employed. Examples of the organic and inorganic metal salts and compounds include: carboxylic acid salts and chelates, such as zinc acetate, zinc o-anisate, manganese tartrate, manganese benzoate, magnesium citrate, ferrous acetate, iron lactate, nickel acetate, cobalt acetate, cobalt benzoate, cobalt propionate, chelates or complexes which involve coordinate bonding and may be partially ionizable such as the zinc chelate of alanine or glycine, calcium chloride, aluminum diacetate, magnesium acetate, calcium carbonate, zirconium acetate, calcium acetate, calcium hydroxide, barium acetate, magnesium chloride, magnesium sulfate, ammonium complexes such as zinc ammonium benzoate, zinc ammonium carbonate or zinc ammonium sulfate, and the like. Any sulfur chelate having both ionic and coordination bonding in which the metal is sufficiently available or dissociable to bind to the carboxylic acid groups of polymer is useful. Polyvalent metal complexes (salts) of organic acids that are capable of miscibility with or in the medium may also be employed. Such anions as acetate, glutamate, formate, carbonate, silicate, glycoate, octoate, benzoate, gluconate, oxylate, o-methoxy aryl carboxylate and lactate are satisfactory. The metal compound must be such that the metal is available to serve its viscosity increasing function; that is, it is attracted to the carboxyl groups by an equivalent mechanism. It is not intended that the invention be limited by theories or hypotheses concerning the mechanism. "Crosslinking" or "viscosity increase" can both be used to describe any of the possible phenomena or mechanisms by which the metal modifies the viscosity of the invention. The most preferred metal salt compounds include zinc octoate, zirconium octoate, zinc o-methoxybenzoate and zinc 3-methoxy-2-naphthenoate.

The metal compound is employed in an amount so that the ratio of metal to the carboxyl groups of the polymer varies from about 0.01 to about 2.0 and preferably from about 0.05 to about 1.5. This is expressed on an equivalency basis as the ratio of metal (such as $Zn^{++}$ to $-COOH$ groups, a ratio of 0.5 being stoichiometric, for divalent metal ions) to polymer acid.

The o-methoxy aryl acid is defined to be a monomeric or polymeric organic compound which contains at least one o-methoxy aryl acid functional group, defined to be a methoxy group and a carboxylic acid group bonded to adjacent carbon atoms which form a portion of an aromatic ring system, such that a carbon atom adjacent to the methoxy substituted carbon of the o-methoxy aryl acid functional group does not form a part of more than one aromatic ring and such that a carbon atom adjacent to either carbon atom of the o-methoxy aryl acid group is not substituted with an alkoxy group.

Examples of aromatic rings systems are benzene, toluene, xylene, biphenyl, biphenylene, naphthalene, azulene, anthracene, phenanthracene, pyridine, aniline, pyrrole, furan, thiophene, indole, benzofuran, benzothiophene, quinoline, isoquinoline, carbazole, imidazole, acridine, thiazole, pyrazine, pyrimidine, pteridine, oxazole, isoxazole, pyridazine, azepine, benzothiazole, difuropyrazine, benzoquinoline and coumarin.

As used throughout the specification and claims, "o-methoxy aryl acid" is defined to denote both the free acid and the corresponding acid anion.

Preferably, the o-methoxy-aryl acid is

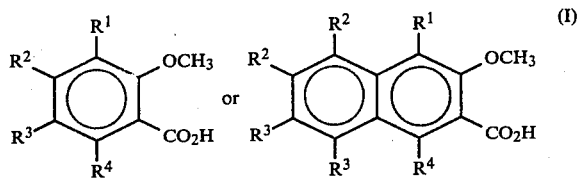
(I)

where $R^1$, $R^2$, $R$ and $R^4$ are independently hydrogen, halogen, nitro, cyano, amino, $(C_1-C_8)$alkyl, $(C_1-C_8)$alkoxy, $(C_2-C_8)$alkenyl, $(C_5-C_8)$cycloalkyl, $(C_5-C_8)$cycloalkenyl, $(C_5-C_8)$cycloalkynyl, $(C_2-C_8)$alkynyl, $(C_1-C_4)$alkyloxy$(C_1-C_4)$alkyl, phenyl or phenyl$(C_1-C_4)$alkyl optionally substituted with up to three substituents on the phenyl ring selected from the group consisting of $(C_1-C_4)$alkyl, $(C_2-C_4)$alkenyl, $(C_2-C_4)$alkynyl, $(C_1-C_4)$alkoxy, hydrogen, halogen, nitro, or cyano, or $(C_1-C_4)$alkyloxy $(C_1-C_4)$alkyl; provided that neither $R^1$ nor $R^4$ is $(C_1-C_8)$alkoxy, provided further that $R^1$ and $R^4$ may, taken together, form a $(C_4-C_8)$alkyl, $(C_5-C_8)$alkenyl, $(C_2-C_4)$alkoxy$(C_2-C_4)$alkyl, or $(C_5-C_8)$alkynyl chain.

More preferably, the o-methoxy aryl acid is given by Formula I above, where $R^1$, $R^2$, $R^3$ and $R^4$ are independently hydrogen, $(C_1-C_4)$alkyl, $(C_2-C_4)$alkenyl, $(C_2-C_4)$alkynyl, $(C_1-C_4)$alkoxy, halogen, or phenyl, benzyl, or phenethyl where the phenyl ring is substituted with up to two substituents selected from the group consisting of hydrogen, $(C_1-C_3)$alkyl, and halogen, provided that neither $R^1$ nor $R^4$ is $(C_1-C_4)$alkoxy.

Still more preferably, the o-methoxy aryl acid is given by Formula I above, where $R^1$, $R^2$, $R^3$ and $R^4$ are independently hydrogen, methoxy, or chlorine, provided that neither $R^1$ nor $R^4$ is methoxy.

Most preferably, the o-methoxy aryl acid is 2-methoxybenzoic acid, 2,4-dimethoxybenzioc acid, 4-chloro-2-methoxybenzoic acid, or 3-methoxy-2-naphthenoic acid.

The o-methoxy aryl acid may be added to the composition in the form of a metal salt anion. The metal cation may be any of those given above. In this form the metal salt can be a salt of a monomeric or polymeric organic compound which contains at least one o-methoxy aryl acid anion functional group, defined to be a methoxy group and a carboxylate anion bonded to adjacent carbon atoms which form a portion of an aromatic ring system, such that a carbon atom adjacent to the methoxy substituted carbon of the o-methoxy aryl acid functional group does not form a part of more than one aromatic ring and such that a carbon atom adjacent to either carbon atom of the o-methoxy aryl acid group is not substituted with an alkoxy group.

Preferably, the o-methoxy aryl acid form of the metal salt is

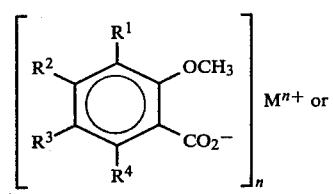
$M^{n+}$ or

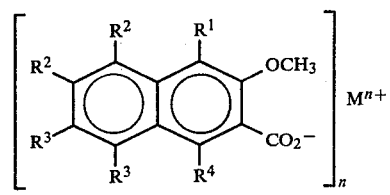
$M^{n+}$ where $n = 1, 2,$ or $3$; and
where $R^1$, $R^2$, $R^3$ and $R^4$ are independently hydrogen, halogen, nitro, cyano, amino, $(C_1-C_8)$alkyl, $(C_1-C_8)$alkoxy, $(C_2-C_8)$alkenyl, $(C_5-C_8)$cycloalkyl, $(C_5-C_8)$cycloalkenyl, $(C_5-C_8)$cycloalkynyl, $(C_2-C_8)$alkynyl, $(C_1-C_4)$alkyloxy$(C_1-C_4)$alkyl, phenyl or phenyl$(C_1-C_4)$alkyl optionally substituted with up to three substituents on the phenyl ring selected from the group consisting of $(C_1-C_4)$alkyl, $(C_2-C_4)$alkenyl, $(C_2-C_4)$alkynyl, $(C_1-C_4)$alkoxy, hydrogen, halogen, nitro, or cyano, or $(C_1-C_4)$alkyloxy$(C_1-C_4)$alkyl; provided that neither $R^1$ nor $R^4$ are $(C_1-C_8)$alkoxy, provided further that $R^1$ and $R^4$ may, taken together, form a $(C_4-C_8)$alkyl, $(C_5-C_8)$alkenyl, $(C_2-C_4)$alkoxy$(C_2-C_4)$alkyl, or $(C_5-C_8)$alkynyl chain; and the $M^{n+}$ is selected from the group consisting of $Na^+$, $K^+$, $Cu^{2+}$, $Fe^{2+}$, $Fe^{3+}$, $Co^{3+}$, $Ni^{2+}$, $Cd^{2+}$, $Ca^{2+}$, $Mg^{2+}$, $Zn^{2+}$, $Zr^{2+}$, $Ba^{2+}$, $Bi^{2+}$, $Pb^{2+}$, and $Co^{3+}$.

More preferably, the o-methoxy aryl acid form of the metal salt is given by Formula II above, where $R^1$, $R^2$, $R^3$ and $R^4$ are independently hydrogen, $(C_1-C_4)$alkyl, $(C_2-C_4)$alkenyl, $(C_2-C_4)$alkynyl, $(C_1-C_4)$alkoxy, halogen, or phenyl, benzyl, or phenethyl where the phenyl ring is substituted with up to two substituents selected from the group consisting of hydrogen, $(C_1-C_3)$alkyl, and halogen, provided that neither $R^1$ nor $R^4$ is $(C_1-C_4)$alkoxy; $n = 1$ or $2$; and $M^{n+}$ is selected from the group consisting of $Na^+$, $K^+$, $Ni^{2+}$, $Ca^{2+}$, $Mg^{2+}$, $Zn^{2+}$, $Zr^{2+}$, $Ba^{2+}$, and $Co^{3+}$.

Still more preferably, the o-methoxy aryl acid form of the metal salt is given by Formula II above, where $R^1$, $R^2$, $R^3$ and $R^4$ are independently hydrogen, methoxy, or chlorine, provided that neither $R^1$ nor $R^4$ is methoxy; $n = 1$ or $2$; and $M^{n+}$ is selected from the group consisting of $Na^+$, $K^+$, $Ca^{2+}$, $Mg^{2+}$, $Zn^{2+}$, $Zr^{2+}$.

Most preferably, the o-methoxy aryl acid form of the metal salt is zinc 2-methoxybenzoate, zinc 2,4-dimethoxybenzoate, zinc 4-chloro-2-methoxybenzoate, or zinc 3-methoxy-2-naphthenoate.

The composition contains between 0.001 and 20% by weight of the polymer of the o-methoxy aryl acid. More preferably, the composition contains between 0.05 and 10% by weight of the polymer of the o-methoxy aryl acid. Still more preferably, the composition contains between 0.5 and 4% by weight of the polymer of the o-methoxy aryl acid as the free acid or as the anion of a metal salt.

The preparation of the acrylate and other polymers of this invention is well known to the art of synthetic polymer synthesis. See, generally, W. R. Sorenson and T. W Campbell, *Preparative Methods of Polymer Chemistry* (Interscience Publishers, Inc., N.Y. 1961), 149–234 (Addition Polymerization from Unsaturated Monomers) and especially 179–180 (Polymerization of Methyl Acrylate); C. E. Schildknecht, *Vinyl and Related Polymers* (John Wiley & Sons, Inc., N.Y. 1952), 220–224 (solution polymerization of methyl methacrylate); *Copolymerization* (G. E. Ham, ed., Interscience Publishers, N.Y.), Ch. XII, "Copolymerizations Involving Acrylates and Methacrylates as Principle Components", 673-674. Polymerization of the monomers can be effected in solution or in bulk, using free radical, cationic or anionic initiation, as is well known in the art.

EXAMPLE 1: ACRYLIC POLYMER PREPARATION

A monomer solution was prepared from 1056 g of butyl acrylate, 238 g of butyl methacrylate, and 26.4 g of methacrylic acid. An initiator solution was prepared from 4.1 g of t-butyl peroctoate, 104 g of toluene and 26 g of acetone. To a flask equipped with a thermometer, a condenser surmounted with a nitrogen inlet, stirrer, and addition funnel was charged 100 g of toluene, 92 g of monomer solution and 9 g of initiator solution. The flask contents were kept under a nitrogen blanket and refluxed (117° C.) for 15 minutes. The remainder of the monomer and initiator solutions were combined and fed into the refluxing flask contents over a one hour period. At the end of this feed, a charge of 2.5 of t-butyl peroctoate and 35 g of toluene was made to decrease the level of unreacted monomers. The polymer solution was diluted to 50% solids with 1478 g of toluene and cooled. When concentrated to 100% solids, the polymer was found to have a viscosity of 8400 cps at 175° C. The product was denoted as polymer A.

In a similar manner the polymers of polymers B-J of Table I were prepared.

TABLE I

Acrylic Solution Polymers

| Polymer | Monomer Composition (wt. percent) |
|---|---|
| A | 0.80 butyl acrylate/0.18 butyl methacrylate/0.02 methacrylic acid |
| B | 0.80 butyl acrylate/0.183 butyl methacrylate/0.017 acrylic acid |
| C | 0.80 butyl acrylate/0.166 butyl methacrylate/0.034 acryloxypropanoic acid |
| D | 0.99 butyl acrylate/0.01 methacrylic acid |
| E | 0.98 butyl acrylate/0.02 methacrylic acid |
| F | 0.97 butyl acrylate/0.03 methacrylate acid |
| G | 0.97 2-ethylhexyl acrylate/0.03 methacrylic acid |
| H | 0.98 isodecyl methacrylate/0.02 methacrylic acid methacrylic acid |
| J | 0.68 isodecyl methacrylate/0.30 2-ethylhexyl methacrylate/0.02 methacrylate acid |

EXAMPLE 2: ACRYLIC IONOMER COMPOSITION PREPARATION

To 750 g of the polymer solution prepared in Example 1 were added 130 g of ethanol, 9.94 g of o-methoxybenzoic acid, and 26.7 g of zinc octoate solution containing 8% zinc by weight. The resulting ionomer solution was mixed and concentrated to 100% solids. The viscosity at 175° C. was 36,000 cps.

EXAMPLE 3: ETHYLENE-ACRYLIC IONOMER COMPOSITION PREPARATION 500 g of VAMAC (trademark of Du Pont De Nemours) VMR 5245 ethylene acrylic ionomer, an elastomer prepared from methyl methylacrylate, ethylene, and carboxylic acid bearing monomers as well as a metal ion "crosslinker", is dissolved in 500 g of xylene. 20 g of o-methoxybenzoic acid is added with agitation to the polymer solution and the solution is stripped of solvent under vacuum to 80% solids. The resulting adhesive displays significantly better room temperature shear resistance than a comparable adhesive without the added o-methoxybenzoic acid.

EXAMPLE 4: VISCOSITY-TEMPERATURE CHARACTERISTICS OF p-METHOXYBENZOIC ACID ADHESIVE COMPOSITION

The viscosity of polymer A above was found to be approximately 8,000 cps at 350° F. One equivalent of zinc octoate increased the viscosity to approximately 80,000 cps. When one equivalent of p-methoxybenzoic acid was added to the polymer containing one equivalent of zinc ion, the viscosity was reduced to approximately 18,000 cps. As illustrated in the FIGURE in which log viscosity is plotted versus reciprocal temperature, this viscosity reduction occurs over the entire temperature range from 200° to 350° F.

However, if instead of p-methoxybenzoic acid, one equivalent of o-methoxybenzoic acid was added to the zinc containing polymer the temperature dependence of the viscosity had an entirely different character.

EXAMPLE 5: VISCOSITY-TEMPERATURE CHARACTERISTIC OF O-METHYLBENZOIC ACID ADHESIVE COMPOSITION

The temperature dependence of the viscosity of the composition of Example 2 had an entirely different character than that observed for the corresponding p-methoxybenzoic acid-containing composition of Example 4. As is illustrated in the FIGURE, a significant viscosity reduction, comparable to that obtained with the addition of the p-methoxybenzoic acid, was obtained at high temperature. On the other hand, when temperature was reduced the viscosity increased at a significantly greater rate than was expected on the basis of the behavior of the polymer containing the zinc and the p-methoxybenzoic acid. In fact, the viscosity of the o-methoxybenzoic containing polymer matches and then exceeds that of the control which does not contain either methoxybenzoic acid.

EXAMPLES 6: ADHESIVE PROPERTIES OF ACRYLIC IONOMER COMPOSITIONS

Table II details the results of testing the adhesive properties of the compositions based on polymer A described above.

Peel adhesion was measured in accord with the Pressure Sensitive Tape Council (PSTC) standard for "Peel Adhesion for Single Coated Tape 180° Angle," PSTC-1, revised 11/75. Shear resistance was measured in accord with PSTC-7, revised 11/75, "Shear Adhesion (holding power)." Test equipment used in these tests was in accord with PSTC Appendage B and the standard test conditions are in accord with PSTC Appendage A. Viscosity was measured with a Brookfield viscometer using an appropriate spindle. Rolling ball tack is measured in accord with PSTC-6.

Qualitative tack was a finger tough comparison executed by three or more individuals skilled in this art. The rating scale, from best to worse is: E (excellent), VG (very good), G (good), F (fair), P (poor) and O (none). Test specimens to be evaluated were compared with a standard consisting of 3M Scotch Magic Mending Tape which is assigned a rating of excellent.

Table II illustrates that although the peel strength of the additive free polymer A is significant (37 oz/in), the polymer exhibits no resistance to shear whatsoever. The adhesive properties which characterize the polymer change when one equivalent of zinc ion has been added.

Although the peel strength has been decreased somewhat (to 15–18 oz/in), the material now exhibits significant shear resistance (24 hours). Adding an equivalent of p-methoxybenzoic acid to this sytem, in addition to the viscosity reduction illustrated in the FIGURE, effects a significant increase in peel strength (to 58 oz/in). However, accompanying the reduction in viscosity, the shear resistance of the p-methoxy-benzoic acid containing system is reduced almost back to the level of the completely unmodified polymer (0.2 hours). On the other hand, although one effect of adding an equivalent of o-methoxybenzoic acid to the zinc-Polymer A system was a very significant reduction in the high temperature viscosity of the material, comparable to that obtained with the other methoxy aryl acid, p-methoxybenzoic acid, the shear resistance of the o-methoxybenzoic acid containing system shows a significant increase (greater than a 100 hours) in contrast to the almost complete loss of shear resistance to the p-methoxybenzoic acid containing system over Polymer A alone.

Comparison of these data with those for adhesive compositions A-2, B-2, and C-2 illustrate the effect of adding a half equivalent of zinc ion to the system. The addition of zinc reduces the qualitative and rolling ball tack, but increases the 180° peel adhesion strength of each of the systems. In addition, each of the zinc-modified systems now exhibits some shear resistance.

In adhesive compositions A-3, B-3 and C-3, the level of added zinc ion is increased to a full equivalent on polymer acid. Again, the character of the change in adhesive properties is independent of the nature of the polymer acid employed. The qualitative and rolling ball tack both decrease and the shear resistance increases. Each of these changes are in qualitative accord with the differences in adhesive properties apparent after the initial addition of a half equivalent of zinc. However, the 180° peel adhesion strength has decreased and the character of failure has changed from cohesive to adhesive.

When a half equivalent of o-methoxybenzoic acid is

TABLE II

Adhesive Properties of Ionomer Compositions

| Zinc Octoate (equivalents on polymer acid) | p-Methoxy benzoic acid (equivalents on polymer acid) | o-Methoxy benzoic acid (equivalents on polymer acid) | Viscosity at 350° F. | Peel[a] Strength/ Failure Mode | Shear[a] Resistance (hours) | Tack (qualitative) |
|---|---|---|---|---|---|---|
| 0 | 0 | 0 | 5,000–8,000 cps | 37 oz/in cohesive | 0 | E+ |
| 1 | 0 | 0 | 80,000–100,000 cps | 15–18 oz/in/ adhesive | 24 | F-G |
| 1 | 1 | 0 | 18,000 cps cohesive | 58 oz/in/ cohesive | 0.2 | E |
| 1 | 0 | 1 | 18,000–25,000 cps | 12–18 oz/in adhesive | 100 | G-VG |

[a]Room temperature, 50% relative humidity.

EXAMPLES 7: EFFECT OF POLYMER COMPOSITION, ZINC LEVEL AND o-METHOXYBENZOIC ACID LEVEL ON ADHESIVE PROPERTIES

Table III details the effects of changes in the nature of the acidic monomer incorporated into the polymer, the level of zinc ion, and the level of o-methoxybenzoic acid on the adhesive properties of the system. The adhesive properties of three acrylic polymers (A-1, B-1 and C-1), each containing an equivalent molar amount of a different carboxylic acid-bearing monomer, were tested. A comparison indicates that the adhesive properties of these materials are essentially the same. Each exhibits excellent qualitative tack and substantial adhesive strength. The mode of failure is cohesive. Shear resistance, however, is non-existent.

added to the system containing one-half equivalent of zinc ion (Compositions A-2, B-2, and C-3) the resulting compositions, A-4, B-4 and C-4, show an increase in shear resistance while tack and peel adhesive strength properties are relatively unchanged. The increase in shear resistance is particularly significant for the methacrylic acid-containing system.

When a full equivalent of o-methoxybenzoic acid is added to those systems containing an equivalent of zinc ion (Compositions A-5, B-5 and C-5), a similarly significant increase in shear resistance is achieved; however, tack and peel strength of the systems containing the o-methoxy-benzoic acid appear to be slightly improved over those other systems which do not contain this additive.

Finally, Composition A-6 shows the effect of adding an equivalent of o-methoxybenzoic acid to the polymer A in the absence of zinc ion. No significant differences are observed.

TABLE III

Effects of Polymer Acid Type, Zn++ Level and o-Methoxybenzoic Acid Level on Adhesive Properties

| | Adhesive Composition | | | Adhesive Properties | | | |
|---|---|---|---|---|---|---|---|
| | | Zn++ Level | | | | | |
| Polymer | Identification | (Equivalents on Polymer Acid) | o-Methoxybenzoic Acid Level (Equivalents on Polymer Acid) | 180° Peel Strength (oz/in) | Shear Resistance (hours) | Rolling Ball Tack | Qualitative Tack |
| A | A-1 | 0 | 0 | 37C | 0 | 2.8 | E+ |
| | A-2 | 0.5 | 0 | 57C | 1.9 | 4.4 | VG+ |
| | A-3 | 1.0 | 0 | 11A | 24 | >7 | G |
| | A-4 | 0.5 | 0.5 | 55AFB[1] | 47 | 3.1 | E |

TABLE III-continued

Effects of Polymer Acid Type, $Zn^{++}$ Level and o-Methoxybenzoic Acid Level on Adhesive Properties

| | Adhesive Composition | | | Adhesive Properties | | | |
|---|---|---|---|---|---|---|---|
| Polymer | Identification | $Zn^{++}$ Level (Equivalents on Polymer Acid) | o-Methoxybenzoic Acid Level (Equivalents on Polymer Acid) | 180° Peel Strength (oz/in) | Shear Resistance (hours) | Rolling Ball Tack | Qualitative Tack |
| | A-5 | 1.0 | 1.0 | 18A | >100 | 6 | G |
| | A-6 | 0 | 1.0 | 38C | 0 | 2.8 | E+ |
| B | B-1 | 0 | 0 | 29C | 0 | 2.0 | E+ |
| | B-2 | 0.5 | 0 | 55C | 0.7 | 3.1 | VG-E |
| | B-3 | 1.0 | 0 | 20A | 23 | >7 | F-G |
| | B-4 | 0.5 | 0.5 | 45A | 42 | 1.7 | E |
| | B-5 | 1.0 | 1.0 | 18A | >100 | 6.0 | G |
| C | C-1 | 0 | 0 | 26C | 0 | 1.0 | E+ |
| | C-2 | 0.5 | 0 | 52C | 0.1 | 3.9 | E |
| | C-3 | 1.0 | 0 | 19A | 0.9 | 5.6 | G |
| | C-4 | 0.5 | 0.5 | 53C | 0.2 | 7 | E |
| | C-5 | 1.0 | 1.0 | 28A | 1.8 | 2 | G-VG |

[1]AFB - Adhesive failure from backing.

EXAMPLE 8: PREPARATION OF ETHYLENE-BASED IONOMER COMPOSITION

To 250 g of a copolymer of composition 85 parts by weight of ethylene, 5 parts by weight of acrylamide, 10 parts by weight of t-butyl acrylate and 5 parts by weight of methacrylic acid is added 6 g of zinc naphthenate and 10 g of 4-chloro-2-methoxybenzoic acid by coextrusion at 230° C.

EXAMPLE 9: PREPARATION OF GRAFTED ACID-OLEFINIC POLYMER BASED IONOMER COMPOSITION

To 250 g of isotactic polypropylene grafted with 6% acrylic acid and having a melt flow rate of 50 at 203° C. as measured according to ASTM Method D-123-57T is added 5 g of zinc octoate and 10 g of o-methoxybenzoic acid. The resulting composition exhibits decreased viscosity at elevated temperature (~400° F.) while maintaining good peel adhesion at room temperature to aluminum foil in comparison with a control composition without the o-methoxybenzoic acid.

EXAMPLE 10: HOT MELT LAMINATING ADHESIVE

In a manner similar to the preparation of polymer A of Example 1 above, a polymer of weight percent composition 0.98 n-butyl methacrylate and 0.02 methacrylic acid is prepared. The polymer is dissolved in toluene to form a 50% solids solution. To 500 g of this solution is added 15 g of zirconium octoate and 24 g of 3-methoxy-2-naphthenoic acid and 60 g of ethanol. The resulting ionomer solution is mixed and concentrated to 100% solids. The resulting composition is useful as a hot melt laminating adhesive.

EXAMPLE 11: PREPARATION OF ADHESIVE COMPOSITION CONTAINING ZINC o-METHOXYBENZOATE

Zinc o-methoxybenzoate was prepared by mixing 32.6 g of zinc oxide with 138 g of o-methoxybenzoic acid and 600 g of water and refluxing for 4 hours. After cooling in an ice bath, the solid was filtered off and dried in a vacuum oven at 25 mm Hg and 50° C. to yield 103 g of zinc o-methoxybenzoate. An elemental analysis gave 52.8% C, 3.95% H and 16.0% Zn (calculated: 52.26% C, 3.81% H and 17.8% Zn).

To 700 g of a 50% solids solution of polymer A in toluene was added 100 g of n-butanol and 12.13 g of zinc o-methoxybenzoate. After stirring and heating at 100° C. for six hours, the resulting clear solution was concentrated on a rotary evaporator to a final temperature of 175° C. and pressure of 25 mm Hg. The adhesive composition was found to have a viscosity of 25,500 cps at 350° F., a peel strength of 17 oz/in; a shear resistance of 23 hours; and a qualitative tack of E.

I claim:
1. A composition comprising
   (a) an organic polymer containing at least one carboxylic group per polymer molecule, and
   (b) at least one miscible metal salt of an o-methoxy aryl acid in a ratio of at least $10^{-3}$ moles of total metal salt to moles of polymer carboxylic acid.
2. A composition according to claim 1 containing
   (a) at least 60% by weight of an organic polymer containing on the average at least one carboxylic acid group per polymer molecule and
   (b) 0.10% to 10% by weight of polymer of at least one miscible metal salt of an o-methoxy aryl acid.
3. A composition according to claim 1 containing
   (a) at least 60% by weight of an organic polymer comprising at least 60% by weight of monomer residues selected from the group consisting of ($C_1$-$C_{18}$)alkyl esters of acrylic and methacrylic acid, containing 0.1 to 10% by weight of carboxylic acid bearing monomer residues,
   (b) 0.10% to 10% by weight of polymer of at least one miscible metal salt of an o-methoxy aryl acid such that the metallic portion is selected from the group consisting of Groups I A, II A, I B, II B, III B, IV B, V B, VI B, and VIII of the periodic table.
4. A composition according to claim 3 containing
   (a) at least 80% by weight of an organic polymer comprising at least 80% by weight monomer residues selected from a class consisting of the ($C_1$-$C_{18}$)alkyl esters of acrylic and methacrylic acid and containing 0.1 to 10% by weight of carboxylic acid bearing monomer residues,
   (b) 0.10% to 10% by weight of polymer of at least one miscible metal salt of an o-methoxy aryl acid such that the metallic portion is selected from the group consisting of Groups I A, II A, II B, I B, IV B, VI B, VII B, and VIII of the periodic table.
5. A composition according to claim 1 containing

(a) at least 50% by weight of an organic polymer comprising at least 80% by weight monomer residues selected from a class consisting of the ($C_1$-$C_{18}$)alkyl esters of acrylic and methacrylic acid and containing 0.1 to 10% by weight of carboxylic acid bearing monomer residues such that the glass transition temperature of the polymer is less than 5° C., (b) 0.10% to 10% by weight of polymer of at least one miscible metal salt of an o-methoxy aryl acid such that the metallic portion is selected from the group consisting of groups I A, II A, I B, II B, IV B, VI B, VII B and VIII of the periodic table.

6. A composition according to claim 1 containing
(a) an organic polymer containing at least 60% by weight of monomer residues from the ($C_1$-$C_{18}$)alkyl esters of acrylic and methacrylic acid and containing on the average at least one carboxylic acid group per polymer molecule,
(b) 0.10% to 10% by weight of polymer of at least one miscible metal salt of an o-methoxy aryl acid having the formula

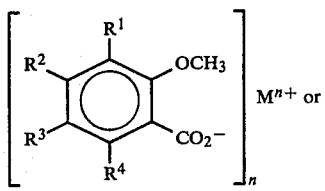

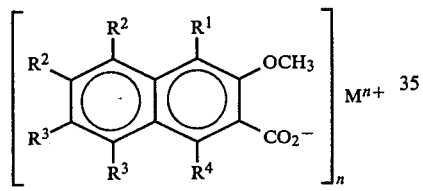

where n=1, 2, or 3 and
where $R^1$, $R^2$, $R^3$, and $R^4$ are independently hydrogen, halogen, nitro, cyano, amino, ($C_1$-$C_4$)alkyl, ($C_1$-$C_4$)alkoxy, ($C_2$-$C_4$)alkenyl, ($C_5$-$C_8$)cycloalkyl, ($C_5$-$C_8$)cycloalkenyl, ($C_5$-$C_8$)cycloalkynyl, phenyl or phenyl($C_1$-$C_4$)alkyl, optionally substituted with up to three substituents on the phenyl ring selected from the group consisting of ($C_1$-$C_4$)alkyl, ($C_2$-$C_4$)alkenyl, ($C_2$-$C_4$)alkynyl, ($C_1$-$C_4$)alkoxy, hydrogen, halogen, nitro, or ($C_1$-$C_4$)alkyloxy ($C_1$-$C_4$) alkyl; provided that neither $R^1$ nor $R^4$ is ($C_1$-$C_8$)alkoxy; provided further that $R^1$ and $R^4$ may, taken together, form a ($C_4$-$C_8$)alkyl, ($C_5$-$C_8$)alkynyl, or ($C_2$-$C_4$)alkoxy($C_2$-$C_4$)alkyl chain; and such that the metallic portion, $M^{n+}$, is selected from the group consisting of Groups I A, II A, I B, II B, IV B, VI B, VII B and VIII of the periodic table.

7. A composition according to claim 6 such that the substituents, $R^1$, $R^2$, $R^3$, and $R^4$ of the o-methoxy aryl acid anion are independently hydrogen, ($C_1$-$C_4$)alkyl, ($C_2$-$C_4$)alkenyl, ($C_2$-$C_4$)alkynyl ($C_1$-$C_4$)alkoxy, halogen, phenyl, benzyl or phenethyl, where the phenyl ring is substituted with up to two substituents selected from the group consisting of hydrogen, ($C_1$-$C_3$)alkyl, and halogen; provided that neither $R^1$ nor $R^4$ is ($C_1$-$C_4$)alkoxy; and the metal ion is $Zn^{++}$, $Zr^{++}$, $Mg^{++}$, $Ca^{++}$, $Na^+$ or $K^+$.

8. A composition according to claim 7 such that the anion substituents $R^1$, $R^2$, $R^3$, and $R^4$ of the o-methoxy aryl acid are independently hydrogen, methoxy or chlorine, provided that neither $R^1$ nor $R^4$ is methoxy; and the metal ion is $Zn^{++}$.

9. A composition according to claim 7 such that the o-methoxy aryl acid anion is 2-methoxybenzoate, 2,4-dimethoxybenzoate, 4-chloro-2-methoxybenzoate, or 3-methoxy-2-naphthenoate and the metal ion is $Zn^{++}$.

10. A composition according to claim 1 containing
(a) at least 50% by weight of an organic polymer containing at least 80% by weight of monomer residues from the ($C_1$-$C_{18}$)alkyl esters of acrylic and methacrylic acid and containing on the average at least one carboxylic acid group per polymer molecule,
(b) 0.10% to 10%, by weight of polymer, of at least one miscible metal salt of an o-methoxy aryl acid given by the formula

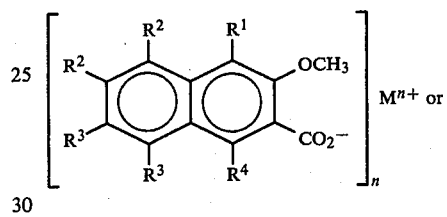

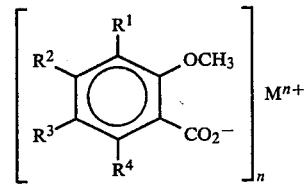

where n=1 or 2 and
where $R^1$, $R^2$, $R^3$, and $R^4$ are independently hydrogen, halogen, nitro, cyano, amino, ($C_1$-$C_8$)alkyl, ($C_1$-$C_8$)alkoxy, ($C_2$-$C_8$)alkenyl, ($C_5$-$C_8$)cycloalkyl, ($C_5$-$C_8$)cycloalkenyl, ($C_5$-$C_8$)cycloalkynyl, phenyl or phenyl-($C_1$-$C_4$)alkyl, optionally substituted with up to three substituents on the phenyl ring selected from the group consisting of ($C_1$-$C_4$)alkyl, ($C_2$-$C_4$)alkenyl, ($C_1$-$C_4$)alkynyl, ($C_1$-$C_4$)alkoxy, hydrogen, halogen, nitro, or ($C_1$-$C_4$)alkyloxy ($C_1$-$C_4$)alkyl; provided that neither $R^1$ or $R^4$ is ($C_1$-$C_8$)alkoxy, and provided further that $R^1$ and $R^4$ may, taken together, form a ($C_4$-$C_8$)alkyl, ($C_5$-$C_8$)alkenyl, ($C_5$-$C_8$)alkynyl, or ($C_2$-$C_4$)alkoxy($C_2$-$C_4$)alkyl chain; such that the metallic portion, $M^{n+}$, is selected from the group consisting of $Zn^{2+}$, $Zr^{2+}$, $Ca^{2+}$ and $Mg^{2+}$ and
(c) optional fillers, extender pigments, tackifying agents, organic solvents, antioxidants, ultraviolet inhibitors, and plasticizers.

11. A composition according to claim 1 containing
(a) at least 80% by weight of an organic polymer containing at least 80% by weight of monomer residues from the ($C_1$-$C_{18}$)alkyl esters of acrylic and methacrylic acids such that the glass transition temperature of the polymer is 0° C. or less and which contains on the average at least one carboxylic acid group per polymer molecule, (b) 0.10 to 10%, by weight of polymer of at least one miscible metal salt of an o-methoxy aryl acid given by the formula

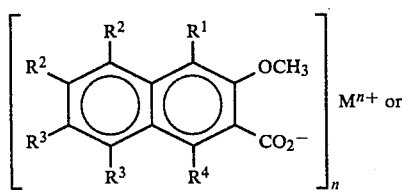

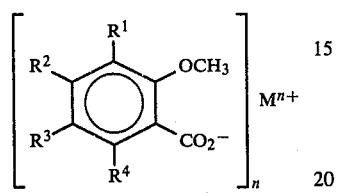

where n=1, 2, or 3 and
where $R^1$, $R^2$, $R^3$, and $R^4$ are independently hydrogen, $(C_1-C_4)$alkyl, $(C_2-C_4)$alkenyl, $(C_1-C_4)$alkoxy, halogen, or phenyl, benzyl or phenethyl where the phenyl ring is substituted with up to two substituents selected from the group consisting of hydrogen, halogen and $(C_1-C_3)$alkyl provided that neither $R^1$ nor $R^4$ is $(C_1-C_4)$alkoxy; such that the metallic portion, $M^{n+}$, is selected from the group consisting of $Zn^{2+}$, $Zr^{2+}$, $Cu^{2+}$, $Mg^{2+}$, $Ca^{2+}$, $Na^{2+}$, $K^+$, $Mn^{2+}$, $Ni^{2+}$, and $Co^{3+}$ and (c) optional fillers, extender pigments, tackifying agents, organic solvents, antioxidants, ultraviolet inhibitors and plasticizers.

12. A composition according to claim 11 containing
(a) at least 90% by weight of an organic polymer containing monomer residues selected from the group consisting of butyl acrylate, butyl methacrylate, 2-ethylhexylacrylate, isodecyl methacrylate, acrylic acid, methacrylic acid, itaconic and maleic acid and acryloxypropanoic acid such that the polymer contains between 0.5% and 4%, by weight of carboxylic acid residue, (b) and between 0.5 and 4%, by weight of polymer of a miscible metal salt of an o-methoxy-aryl acid salt selected from the group consisting of zinc 2-methoxybenzoate, zinc 2,4-dimethoxybenzoate, zinc 4-chloro-2-methoxybenzoate and zinc 3-methoxy-2-naphthenoate.

* * * * *